(12) United States Patent
Kerns

(10) Patent No.: US 9,995,423 B2
(45) Date of Patent: Jun. 12, 2018

(54) PIPE REPAIR KIT

(71) Applicant: James P. Kerns, West Orange, NJ (US)

(72) Inventor: James P. Kerns, West Orange, NJ (US)

( * ) Notice: Subject to any disclaimer, the term of this patent is extended or adjusted under 35 U.S.C. 154(b) by 0 days. days.

(21) Appl. No.: 15/076,872

(22) Filed: Mar. 22, 2016

(65) Prior Publication Data

US 2017/0276283 A1    Sep. 28, 2017

(51) Int. Cl.
*F16L 55/16*     (2006.01)
*F16L 55/168*    (2006.01)

(52) U.S. Cl.
CPC .................. *F16L 55/168* (2013.01)

(58) Field of Classification Search
USPC ...................................... 138/99, 97
See application file for complete search history.

(56) References Cited

U.S. PATENT DOCUMENTS

| | | | | | |
|---|---|---|---|---|---|
| 144,997 | A * | 11/1873 | Mayall | ............. | F16L 33/02 24/68 BT |
| 2,462,504 | A * | 2/1949 | Kass | ............. | F16L 55/168 138/99 |
| 2,936,186 | A * | 5/1960 | Dunmire | ............. | F16L 21/005 138/99 |
| 3,042,430 | A * | 7/1962 | Guy | ............. | F16L 23/06 24/270 |
| 3,214,202 | A * | 10/1965 | Maychark | ............. | F16L 23/06 24/273 |
| 3,603,616 | A * | 9/1971 | Smith | ............. | F16L 23/165 138/97 |
| 4,657,284 | A * | 4/1987 | Fiori | ............. | F16L 23/10 24/20 S |
| 4,867,490 | A * | 9/1989 | Arnoldt | ............. | F16L 23/08 285/367 |
| 5,123,451 | A * | 6/1992 | Savard | ............. | F16L 55/17 138/99 |
| 5,166,475 | A * | 11/1992 | Ackerman | ............. | F16L 25/01 174/47 |
| 5,375,888 | A * | 12/1994 | Ikeda | ............. | F16L 55/172 138/99 |
| 5,563,374 | A * | 10/1996 | Hubert | ............. | B64D 11/02 174/84 R |
| 5,692,544 | A * | 12/1997 | Friedrich | ............. | F16L 55/178 138/109 |
| 2006/0118191 | A1 * | 6/2006 | Rice | ............. | F16L 55/1686 138/99 |
| 2012/0279601 | A1 * | 11/2012 | Kerr | ............. | F16L 55/172 138/97 |

* cited by examiner

*Primary Examiner* — James Hook
(74) *Attorney, Agent, or Firm* — Hoffmann & Baron, LLP

(57) ABSTRACT

A pipe repair apparatus is provided. The pipe repair apparatus includes a cap. The cap includes a cylinder shape having a front edge forming an opening into the cap, a rear edge forming an opening into the cap, and at least a first side edge and a second side edge. The cap may further include a cap flange formed at the front edge having a first bend in a direction towards a central longitudinal axis of the cap and a second bend in a direction away from the central longitudinal axis of the cap. The cap is sized to fit over a pipe so that the first side edge overlaps the second side edge. A clamp secures the cap to the pipe.

10 Claims, 3 Drawing Sheets

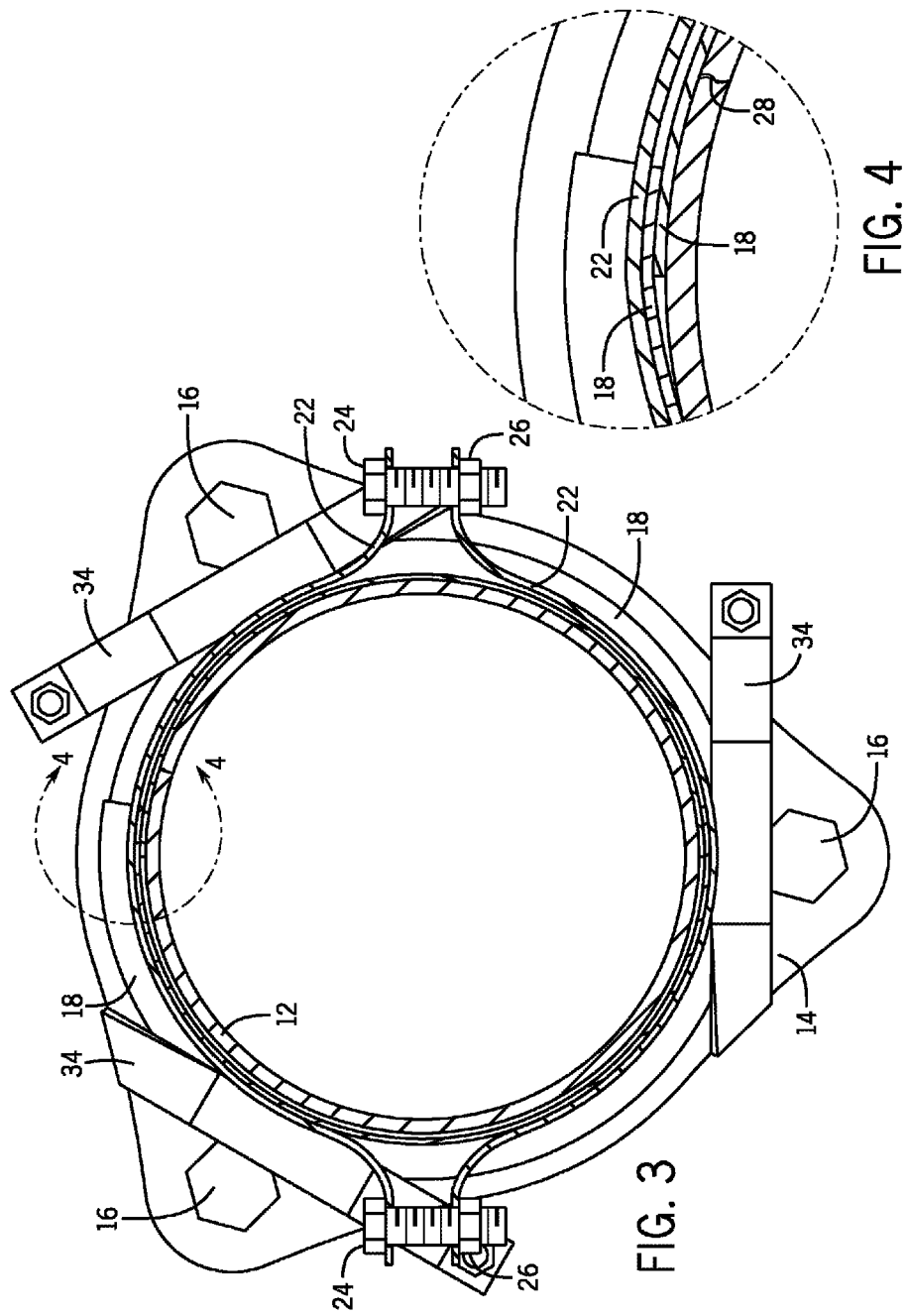

PIPE REPAIR KIT

BACKGROUND OF THE INVENTION

The present invention relates to cracked pipes and, more particularly, to a pipe repair kit that repairs cracked pipes.

Currently, to repair a damaged pipe, a pipe repair kit is used. Bouncing occurs when the crack is near the weld, which means the pipe can separate from the base or flange. The only current method of preventing the above issues is by additional welding, which adds time for the repair.

As can be seen, there is a need for an improved pipe repair kit that does not dislodge due to vibrations.

SUMMARY OF THE INVENTION

In one aspect of the present invention, a pipe repair apparatus comprises: a cap comprising a cylinder shape having a front edge forming an opening into the cap, a rear edge forming an opening into the cap, and at least a first side edge and a second side edge, wherein a cap flange is formed at the front edge comprising a first bend in a direction towards a central longitudinal axis of the cap and a second bend in a direction away from the central longitudinal axis of the cap; and a clamp operable to secure the cap to a pipe, wherein the cap is sized to fit around a pipe so that the first side edge and the second side edge overlap.

In another aspect of the present invention, a method of repairing a pipe comprises: providing a cap comprising a cylinder shape having a front edge, a rear edge, and at least a first side edge and a second side edge, wherein a cap flange is formed at the front edge comprising a first bend in a direction towards a central longitudinal axis of the cap and a second bend in a direction away from a central axis of the cap; wrapping the cap around a pipe and covering a crack in the pipe, wherein the first side edge overlaps the second side edge and the cap flange covers at least a portion of a pipe flange; and clamping the cap to at least one of the pipe flange and the pipe.

These and other features, aspects and advantages of the present invention will become better understood with reference to the following drawings, description and claims.

BRIEF DESCRIPTION OF THE DRAWINGS

FIG. 3 is a cross-sectional view taken along line 3-3 in FIG. 1; and

FIG. 4 is a detail cross-sectional view taken along line 4-4 in FIG. 3.

DETAILED DESCRIPTION OF THE INVENTION

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

Figure 1:
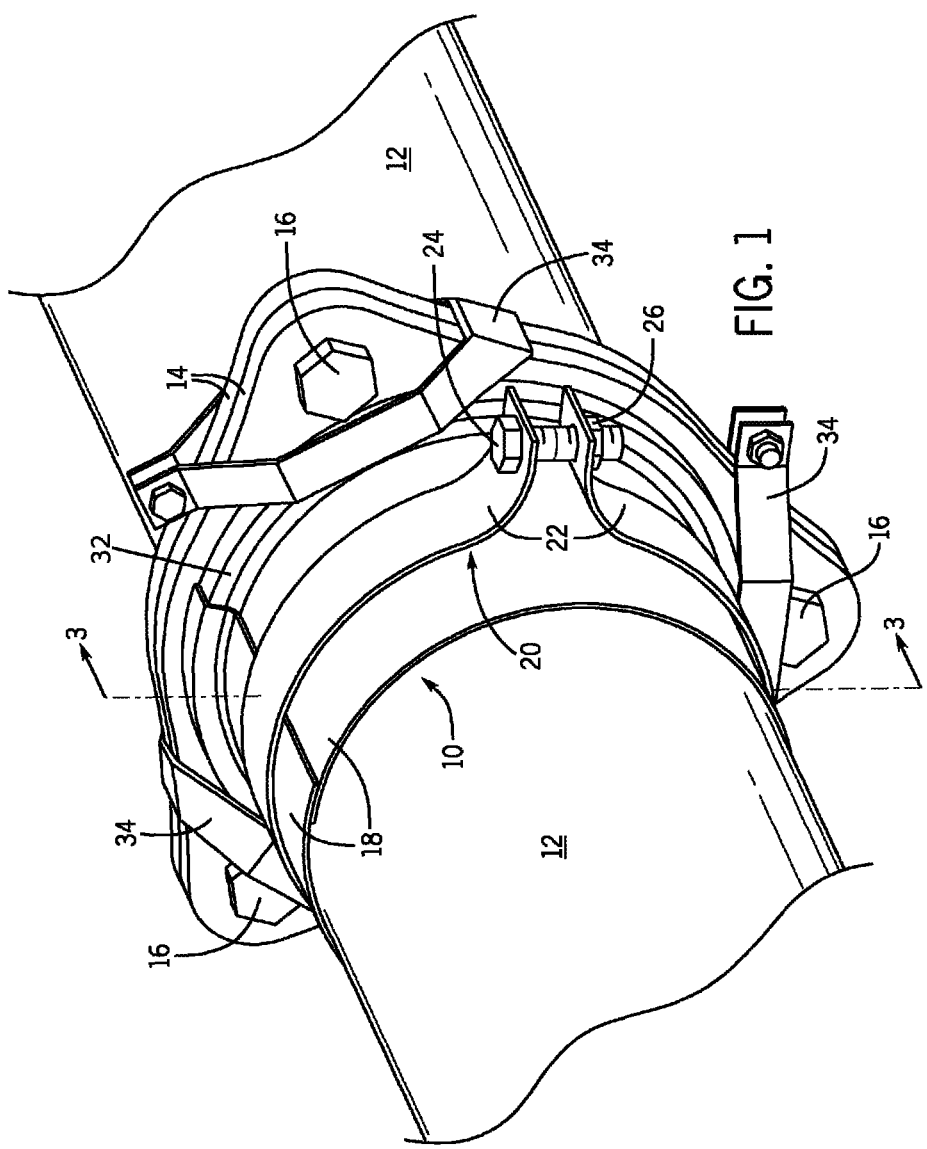
FIG. 1 is a perspective view of an embodiment of the present invention in use.
Figure 2:
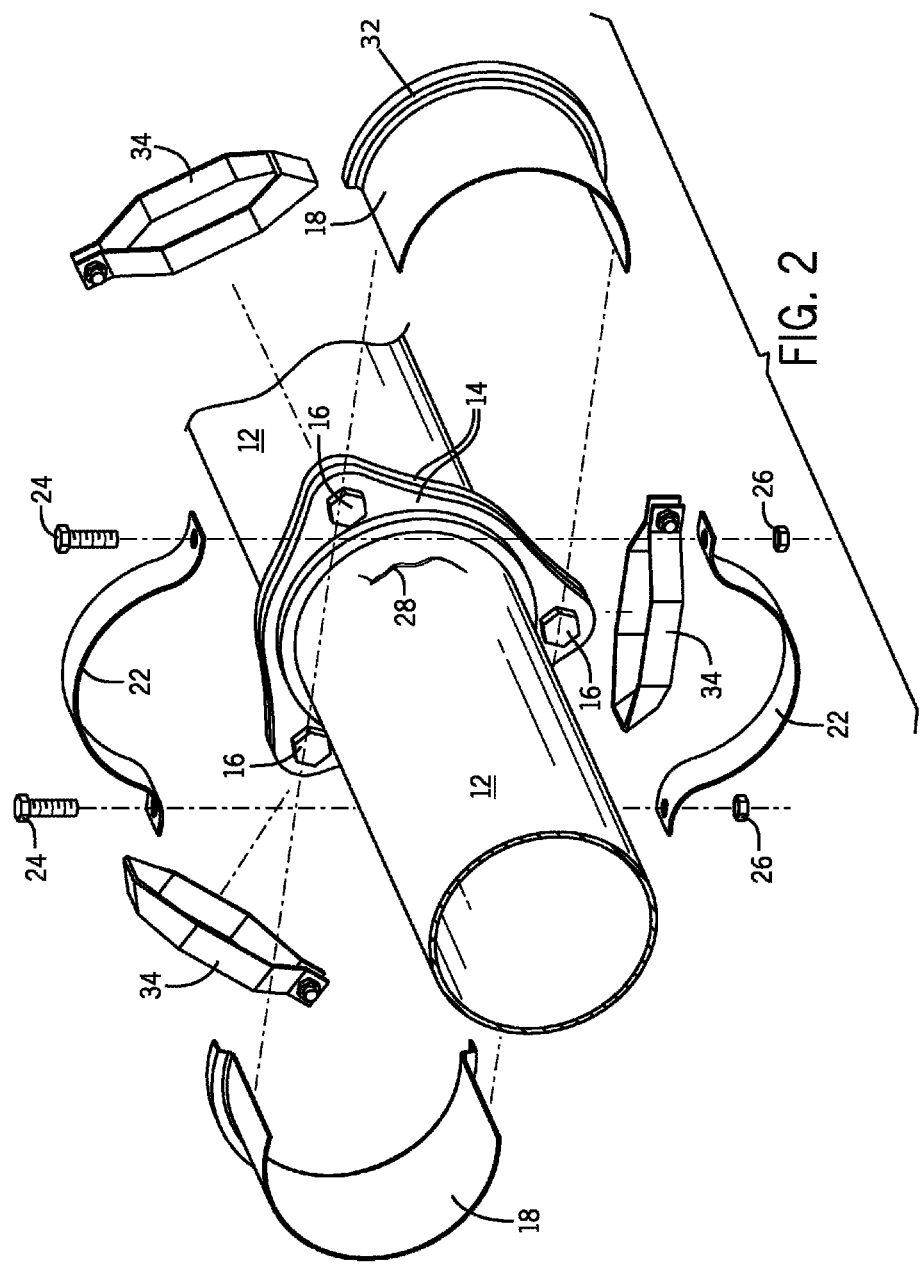
FIG. 2 is an exploded perspective view of an embodiment of the present invention.

Referring to FIGS. 1 through 4, the present invention includes a pipe repair apparatus 10. The pipe repair apparatus 10 includes a cap 18. The cap 18 includes a cylinder shape having a front edge forming an opening into the cap 18, a rear edge forming an opening into the cap 18, and at least a first side edge and a second side edge. The cap 18 may further include a cap flange 32 formed at the front edge. The cap flange 32 extends from a substantial portion, such as the entire portion, of the circumference of the front edge. The cap flange 32 has a first bend in a direction towards a central longitudinal axis of the cap 18 and a second bend in a direction away from the central longitudinal axis of the cap 18. The cap 18 is sized to fit over a pipe 12 so that the first side edge overlaps the second side edge. A clamp 20 secures the cap 18 to the pipe 12.

The cap 18 may be secured over the pipe 12, where a first pipe 12 and a second pipe 12 meet. The cap 18 is used to cover a crack 28 in one or both of the pipes 12. A pipe flange 14 of the first pipe 12 is secured to a pipe flange 14 of a second pipe 12 via connectors, such as pipe bolts 16 and pipe nuts 17. The cap 18 may be secured around one of the pipes 12 so that the cap flange 32 covers a portion of the pipe flange 14. A rubber O-ring or gasket may be disposed in between the cap flange 32 and the pipe flange 14 to add an additional seal. In certain embodiments, if there are cracks 28 on both pipes 12, the cap 18 may be secured to either side of the pipe flange 14.

In certain embodiments, the cap 18 includes a first half and a second half. Each half may be C-shaped forming the cylinder shape when connected together. The first half includes a first side edge and a second side edge and the second half includes a first side edge and a second side edge. When the first half and the second half are secured to the pipe 12, the first side edge of the first half overlaps the second side edge of the second half and the first side edge of the second half overlaps the second side edge of the first half. The side edges may be crimped to provide a low profile overlap.

The clamp 20 of the present invention may include at least one band 22 having a first end and a second end. As illustrated in FIG. 3, the band 22 may wrap around the cap 18, urging the overlapping edges of the cap 18 together. The first end and the second end may be secured together by connectors, such as, but not limited to, latches, nuts 26 and bolts 24, hooks, and the like. In certain embodiments, the first end and the second end may each include an aperture aligned with the other. A bolt 24 may fit through the aligned apertures and a nut 26 may secure to a threaded end of the bolt 24, thereby securing the first end and the second end together.

In certain embodiments, the present invention may include a first band 22 and a second band 22 each having a first end and a second end. In certain embodiments, the first ends may be hinged together and the second ends may include apertures. In certain embodiments, the first ends and the second ends each include an aperture. The apertures of the first band 22 align with the apertures of the second band 22. Latches or bolts 24 may fit through the aligned apertures and nuts 26 may secure to threaded ends of the bolts 24, thereby securing the first band 22 to the second band 22 together.

For additional clamping, a second clamp may be used. The second clamp may include a side band 34 which is sized to wrap around the cap flange 32 and the pipe flange 14, thereby securing the cap 18 to the pipe flange 14 together. The ends of the side band 34 may be secured together by a connector, such as latches, bolts 24 and nuts 26, hooks and the like.

A method of repairing the pipe 12 may include the following steps: providing a cap 18 having a cylinder shape having a front edge, a rear edge, at least a first side edge and a second side edge, and a cap flange 32 formed at the front edge having a first bend in a direction towards a central longitudinal axis of the cap 18 and a second bend in a direction away from a central axis of the cap 18; wrapping the cap 18 around the pipe 12 and covering a crack 28 in the pipe 12, wherein the first side edge overlaps the second side edge and the cap flange 32 covers at least a portion of a pipe flange 14; and securing the cap 18 to at least one of the pipe flange 14 and the pipe 12 via a clamp 20. Further, a side band 34 may be wrapped around the cap flange 32 and the pipe flange 14 and secured via a bolt 24 and nut 26. The overlapping of the side edges, the cap flange 32 covering at least a portion of the pipe flange 14 and the side band 34 wrapped around the cap flange 32 and the pipe flange 14 prevents the pipe repair apparatus 10 from dislodging due to vibrations.

It should be understood, of course, that the foregoing relates to exemplary embodiments of the invention and that modifications may be made without departing from the spirit and scope of the invention as set forth in the following claims.

What is claimed is:

1. A pipe repair apparatus comprising:
   a cap comprising a cylinder shape having a front edge forming an opening into the cap, a rear edge forming an opening into the cap, at least a first side edge and a second side edge, and a cap flange formed at the front edge comprising a first bend in a direction towards a central longitudinal axis of the cap and a second bend in a direction away from the central longitudinal axis of the cap; and
   a clamp operable to secure the cap to a pipe, the pipe having a pipe flange, wherein
   the cap is sized to fit around the pipe such that the first side edge and the second side edge overlap, and wherein the cap flange covers only a portion of the pipe flange and does not extend beyond the pipe flange.

2. The pipe repair apparatus of claim 1, wherein the cap comprises a first half comprising a first side edge and a second side edge and a second half comprising a first side edge and a second side edge, wherein the first half and the second half are sized to fit around the pipe such that the first side edge of the first half overlaps the second side edge of the second half and the first side edge of the second half overlaps the second side edge of the first half.

3. The pipe repair apparatus of claim 1, wherein the clamp comprises at least one band having a first end and a second end, wherein the at least one band is sized to wrap around the cap and the first end and the second end are secured together by a connector.

4. The pipe repair apparatus of claim 3, wherein each of the first end and the second end comprises an aperture aligned with the other, wherein the connector comprises a bolt that fits through the aligned apertures securing the first end and the second end together.

5. The pipe repair apparatus of claim 3, further comprising a second clamp comprising at least one side band having a first end and a second end, wherein the at least one side band is sized to wrap around the cap flange and a pipe flange, wherein the first end and the second end are secured together by the connector.

6. The pipe repair apparatus of claim 5, wherein each of the first end and the second end of the at least one side band comprises an aperture, wherein the apertures align, wherein the connector comprises a bolt that fits through the aligned apertures securing the first end and the second end together.

7. A method of repairing a pipe comprising:
   providing a cap comprising a cylinder shape having a front edge, a rear edge, at least a first side edge and a second side edge, and a cap flange formed at the front edge comprising a first bend in a direction towards a central longitudinal axis of the cap and a second bend in a direction away from the central longitudinal axis of the cap;
   wrapping the cap around the pipe, the pipe having a pipe flange, and covering a crack in the pipe, wherein the first side edge overlaps the second side edge and the cap flange covers only a portion of the pipe flange and does not extend beyond the pipe flange; and
   clamping the cap to at least one of the pipe flange and the pipe.

8. The method of claim 7, wherein the cap comprises a first half comprising a first side edge and a second side edge and a second half comprising a first side edge and a second side edge, wherein the first side edge of the first half overlaps the second side edge of the second half and the first side edge of the second half overlaps the second side edge of the first half.

9. The method of claim 7, wherein the clamp comprises at least one band having a first end and a second end, wherein the at least one band is wrapped around the cap and the first end and the second end are bolted together.

10. The method of claim 7, wherein the clamp comprises at least one side band having a first end and a second end, wherein the at least one side band is wrapped around the pipe flange and the cap flange, and the first end and the second end are bolted together.

* * * * *